United States Patent
Kanegae et al.

(10) Patent No.: US 12,496,008 B2
(45) Date of Patent: Dec. 16, 2025

(54) ACTIVITY STATE PREDICTION SYSTEM, ACTIVITY STATE PREDICTION METHOD, AND PROGRAM

(71) Applicant: HEALTH SENSING CO., LTD., Hachioji (JP)

(72) Inventors: Masatomo Kanegae, Hachioji (JP); Kyuichi Niizeki, Hachioji (JP)

(73) Assignee: HEALTH SENSING CO., LTD., Tokyo (JP)

( * ) Notice: Subject to any disclaimer, the term of this patent is extended or adjusted under 35 U.S.C. 154(b) by 264 days.

(21) Appl. No.: 18/569,758

(22) PCT Filed: Jan. 23, 2023

(86) PCT No.: PCT/JP2023/002765
§ 371 (c)(1),
(2) Date: Dec. 13, 2023

(87) PCT Pub. No.: WO2023/140390
PCT Pub. Date: Jul. 27, 2023

(65) Prior Publication Data
US 2024/0277284 A1    Aug. 22, 2024

(30) Foreign Application Priority Data
Jan. 24, 2022   (JP) ................. 2022-019104

(51) Int. Cl.
*A61B 5/00* (2006.01)
*A61B 5/0245* (2006.01)
(Continued)

(52) U.S. Cl.
CPC .......... *A61B 5/4809* (2013.01); *A61B 5/0245* (2013.01); *A61B 5/08* (2013.01); *A61B 5/113* (2013.01); *A61B 2503/40* (2013.01)

(58) Field of Classification Search
CPC ..... A61B 2503/40; A61B 5/0245; A61B 5/08; A61B 5/0816; A61B 5/11; A61B 5/1102;
(Continued)

(56) References Cited

U.S. PATENT DOCUMENTS

2010/0030118 A1   2/2010   Hiei et al.

FOREIGN PATENT DOCUMENTS

| JP | 2008-142238 A | 6/2008 |
|---|---|---|
| JP | 2010-264193 A | 11/2010 |

(Continued)

OTHER PUBLICATIONS

PCT/ISA/210, "International Search Report for PCT International Application No. PCT/JP2023/002765," Mar. 7, 2023.

*Primary Examiner* — Michael T Rozanski
(74) *Attorney, Agent, or Firm* — Kreative IP Management LLC; Fuiyeong Kim

(57) ABSTRACT

The present invention delivers an activity state prediction system predicts leaving-bed/awake/sleeping state in a real-time and accurate manner. An activity state prediction model is established using information on leaving-bed/awake/sleeping state based on sleep polysomnography data as teaching data and body movement signal, respiratory rate, heart rate, and phase coherence acquired simultaneously with the teaching data as input data and then predicts leaving-bed/awake/sleeping state in response to entry of data on the body movement signal, respiratory rate, heart rate, and phase coherence obtained from the bio-vibration signals detected by a sensor.

5 Claims, 7 Drawing Sheets

(51) Int. Cl.
*A61B 5/08* (2006.01)
*A61B 5/113* (2006.01)

(58) Field of Classification Search
CPC ......... A61B 5/113; A61B 5/16; A61B 5/4809; A61B 5/4812; A61B 5/7267
See application file for complete search history.

(56) References Cited

FOREIGN PATENT DOCUMENTS

| | | |
|---|---|---|
| JP | 2019-010437 A | 1/2019 |
| JP | 2019-134953 A | 8/2019 |

ACTIVITY STATE PREDICTION SYSTEM, ACTIVITY STATE PREDICTION METHOD, AND PROGRAM

RELATED APPLICATIONS

The present application is a National Phase Application of International Application No. PCT/JP2023/002765 filed on Jan. 23, 2023, which claims a priority from Japanese Patent Application No. 2022-019104, filed on Jan. 24, 2022, the disclosure of which is hereby incorporated by reference herein in its entirety.

TECHNICAL FIELD

The present invention relates to a system or method that predicts an activity state of an animal, which is lying on a mat equipped with a sheet-type sensor and may be in a leaving-mat, awake, or sleeping state, based on the movement information or biological information acquired with the sensor.

BACKGROUND ART

Sleep polysomnography and actigraphy are known methods for activity state prediction in humans.

Sleep polysomnography is performed at medical institutions or elsewhere using a measuring system rented from a medical institution, but it requires multiple sensors for electroencephalogram (EEG), electrocardiogram (ECG), electromyogram (EMG), electrooculogram (EOG), etc., involving complicated handling. In addition, the multiple sensors have to be attached to specified body sites, causing problems such as their body restraint and accidental removal by subject's unconscious movement during sleep.

Furthermore, actigraphy technique has a known problem in delivering a prediction result real-time because it predicts the current state based on the previous and future data (Patent literature 1).

As a solution of the problem in actigraphy technique, Patent literature 2 discloses a real-time sleep prediction apparatus using tube-shaped body movement detection means. However, since the body movement detection part is not a flat surface, if a subject animal is smaller than the size of the mat, the body movement detection means would fail to detect body movement of the animal due to the presence of the animal outside of the detection means and thus may lead to wrong prediction of the activity state.

PRECEDING TECHNICAL LITERATURE

Patent Literature

Patent literature 1: Jpn. unexamined patent publication 2010-264193
Patent literature 2: Jpn. unexamined patent publication 2008-142238

SUMMARY OF INVENTION

Technical Problem

To solve such problem, the present invention delivers an activity state prediction system that predicts which of leaving-bed, awake, and sleeping states the subject is currently in (or predicts leaving-bed/awake/sleeping state) in a real-time and accurate manner based on phase coherence ($\lambda$) of an instantaneous phase difference between body movement signal, respiratory rate, heart rate, or heartbeat interval variation and respiratory pattern calculated from signals acquired with the sheet-type vibration sensor.

Solution to Problem

An activity state prediction system, comprising:
a sensor part configured to detect bio-vibration signals of an animal;
a bio-vibration signal receiving part configured to receive bio-vibration signals output by the sensor part;
a body movement signal detection part configured to output body movement signals from the bio-vibration signals;
a respiratory rate detection part configured to output respiratory rate from the bio-vibration signals;
a heart rate detection part configured to detect heart rate from the bio-vibration signals; a phase coherence computation part configured to calculate phase coherence from a difference in instantaneous phase between heartbeat interval variation and respiratory pattern detected from the bio-vibration signals; and
an activity state prediction apparatus configured to predict the activity state, which undergoes machine learning using information on leaving-bed/awake/sleeping state based on sleep polysomnography data as teaching data and body movement signal, respiratory rate, heart rate, and phase coherence calculated from a difference in instantaneous phase between heartbeat interval variation and respiratory pattern as input data, each data is acquired simultaneously with the teaching data to establish an activity state prediction model and then predicts in which of the leaving-bed, sleeping, and awake states of a test animal in response to entry of the body movement signals, respiratory rate, heart rate, and phase coherence of the test animal.

Furthermore, the activity state prediction apparatus establishes an activity state prediction model through adaptive boosting with weak learners (decision tree) combined in series.

In addition, the activity state prediction apparatus predicts an activity state in response to entry of the previous 2 to 20 data sets on the body movement signals, respiratory rate, heart rate, and phase coherence.

Advantageous Effect of Invention

The present invention enables real-time monitoring of the awake/sleeping or leaving-bed/awake/sleeping state of the animal lying on a mat equipped with a sheet-type sensor.

BRIEF DESCRIPTION OF DRAWINGS

FIG. 2(A) illustrates activity state predicted based on PSG data in the top graph and activity state predicted by the present invention in the bottom graph, and FIG. 2(B) illustrates a confusion matrix of the prediction results and measured values (true values).

FIG. 9(A), FIG. 9(B), and FIG. 9(C) illustrate ROC curves for the sleeping, awake, and leaving-bed states, respectively.

DESCRIPTION OF EMBODIMENTS

Figure 1:
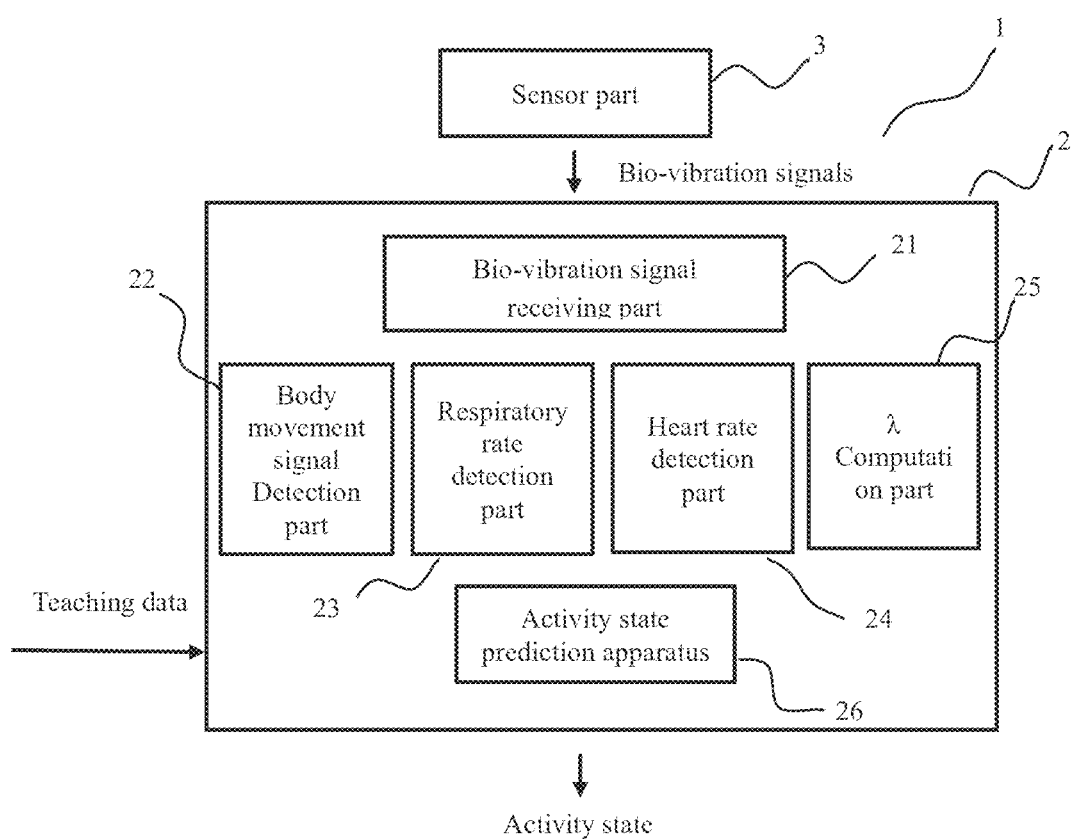
FIG. 1 Simplified block diagram of activity state prediction system

The sensor part 3 detects bio-vibrations of an animal and outputs bio-vibration signals. For example, the sensor part 3 is a sheet-type piezoelectric sensor, installed in a mat on which an animal lies, and outputs bio-vibration signals based on body movements, heartbeats (ballistocardiographic signals by heart beating), respiration, and vocalization, but the signals may include ones derived from vibrations caused by external environment, etc. Of note, the sensor part 3 is not limited to the sheet-type piezoelectric sensor.

The bio-vibration signal receiving part 21 receives bio-vibration signals output by the sensor part 3. The sensor part 3 and bio-vibration signal receiving part 21 are connected through communication means such as cable or wireless.

The body movement signal detection part 22 receives (inputs) bio-vibration signals and outputs body movement signals. The bio-vibration signals include signals related to heartbeats and respiration, but the body movement signals are greater than ones related to heartbeats and respiration. The body movement signal detection part 22 converts the body movement signals into signals in appropriate amplitude and outputs them. In addition, the body movement signals are output as pulses and thus may be subjected to derivation processing, which allows counting of rises in a specified period and thereby outputting of the count of body movements in the specified period The respiratory rate detection part 23 receives (inputs) bio-vibration signals and outputs respiratory rate. Because signals related to respiration included in the bio-vibration signals are much smaller than the body movement signals (usually smaller than $1/100$ of the body movement signals), the following processing is required to calculate the respiratory rate.

The bio-vibration signals may be enhanced by raising their intensity to the nth power (where n is an integer greater than 1; if n is an odd number, the absolute value should be taken), and then the enhanced signals may be passed through a low pass filter (LPF) that allows signals at a frequency lower than 0.5 Hz to pass. Cutoff frequency of the LPF in the respiration waveform extraction means 33 may be 0.3, 0.4, 0.6, 0.7, or 0.8 Hz.

Alternatively, in place of the low pass filer (LPF), a band pass filter (BPF) may be used. The lower limit of frequency for the BPF may be anything as long as it is adequately low. For example, 0.1 Hz may suffice.

The respiratory rate can be calculated by counting peaks of such obtained periodic respiration waveforms.

The heart rate detection part 24 receives (inputs) bio-vibration signals, extracts heartbeat signals, and calculate heart rate.

Because heartbeat signals included in the bio-vibration signals are much smaller than body movement signals (usually smaller than $1/100$ of the body movement signals), the following processing is required to calculate the heart rate.

(1) The bio-vibration signals are processed with a BPF of 1 to 4 Hz, and periodic peaks in a specified period are counted. The band of the BPF is not limited to that from 1 to 4 Hz. The lower limit of frequency may be not less than 0.5, 0.6, 0.7, 0.8, 0.9, or 1 Hz, and the upper limit of frequency may be not more than 10, 8, 6, 5, or 3 Hz.

(2) The bio-vibration signals are enhanced by raising their intensity to the nth power (where n is an integer greater than 1; if n is an odd number, the absolute value should be taken), and then the enhanced signals may be passed through a BPF to count periodic peaks in a specified period.

(3) The bio-vibration signals are wavelet-transformed to count periodic peaks in a specified period.

The phase coherence computation part 25 calculates phase coherence as an instantaneous phase difference between heartbeat interval variation and respiratory pattern.

The phase coherence computation part is comprised of a biological information acquisition means that acquires biological information on heartbeats, respiration, and others, a respiration waveform extraction means that extracts respiratory pattern, a heartbeat interval calculation means that calculates heartbeat interval variations, and a phase coherence calculation means that calculates phase coherence of an instantaneous phase difference between heartbeat interval variation and respiratory pattern. For details, see WO2017/141976 (an earlier application of the applicant).

The activity state prediction apparatus 26 undergoes machine learning for prediction of leaving-bed/awake/sleeping state using PSG output data from animals except the test animal as teaching data and data on body movement signals, respiratory rate, heart rate, and phase coherence ($\lambda$) as input data.

The machine learning uses adaptive boosting with weak learners (decision tree) combined in series.

Then, data on body movement signals, respiratory rate, heart rate, and phase coherence ($\lambda$) obtained from the test animal are entered for prediction of leaving-bed/awake/sleeping state of the animal.

Each parameter value is acquired every 30 seconds because PSG data are output every 30 seconds.

Because prediction for leaving-bed/awake/sleeping state is performed using previous n data sets, the prediction result can be output every 30 seconds when at least 30*n seconds have passed since start of the measurement.

A study where n varied from 2 to the number at least enabling real-time output (~20) indicated that numbers around 8 are appropriate, but another number may be acceptable.

Example

Firstly, data from 138 subjects are subjected to the machine learning in the activity state prediction system in FIG. 1. For the activity state prediction apparatus 26 in the activity state prediction system 2, adaptive boosting with weak learners (decision tree) combined in series is used.

The teaching data are activity state assessed by PSG, while the input data are data on body movement signals, respiratory rate, heart rate, and phase coherence (λ) measured simultaneously with PSG.

The body movement signals are acquired every 30 seconds as an average of 6 values obtained by the body movement signal detection part 22, which collects bio-vibration signals in a 10-second window and assesses presence or absence of body movement, while moving the window by 5 seconds after each prediction. For example, where zero (0) means absence of body movement and one (1) means its presence, 6 values of 0, 0, 1, 1, 0, and 0 give the body movement signal ⅓. This period of 30 seconds is specified to match the PSG output interval of 30 seconds.

For respiratory rate, the respiratory rate detection part 23 counts peaks of respiration waveforms in a period of 30 seconds and outputs the count.

For heart rate, the heart rate detection part 24 counts peaks of heartbeat waveforms in a period of 30 seconds and outputs the count.

For phase coherence, the phase coherence computation part 25 outputs the calculation result every 30 seconds.

The activity state prediction apparatus 26 predicts the current activity state based on the previous n data sets. Accordingly, the activity state is not output for the first several minutes (where n=8, 30 seconds×8=4 minutes), but after this period has passed, the real-time activity state is output every 30 seconds.

[Example where Leaving-Bed/Awake/Sleeping State is Predicted Based on the Previous 8 Data Sets]

Firstly, machine learning was performed by an ensemble learner with weak learners combined in series (adaptive boosting), using measured PSG values from 138 subjects as teaching data and data on body movement signals, respiratory rate, heart rate, and phase coherence (λ) measured simultaneously with PSG as input data. The training was performed using data from 137 out of 138 subjects, leaving out of 1 subject for leave-one-out cross-validation.

Then, the previous 8 data sets on body movement signals, respiratory rate, heart rate, and phase coherence (λ) obtained from the subject for validation are entered in the ensemble learner for prediction of leaving-bed/awake/sleeping state.

Figure 2A:
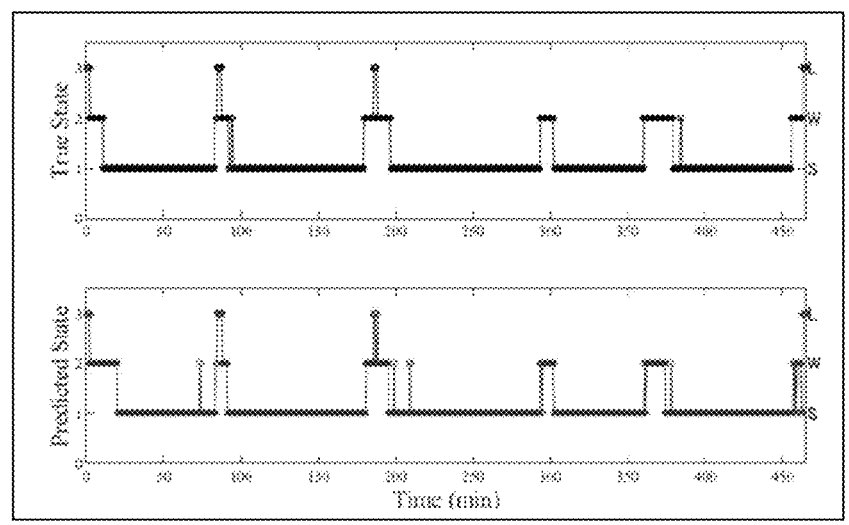
FIG. 2(A) and FIG. 2(B) Example of activity state prediction from the previous 8 data sets in a subject.

FIG. 2 illustrates an example of the activity state prediction results of a subject. The top graph in FIG. 2A illustrates measured PSG values (true values), and L, S, and W stand for leaving-bed, sleeping, and awake states, respectively. The bottom graph in FIG. 2A illustrates prediction results from the ensemble learner. These graphs have an accuracy of 0.937 with Kappa coefficient of 0.768, indicating achievement of "well-agreed" prediction results.

Figure 2B:
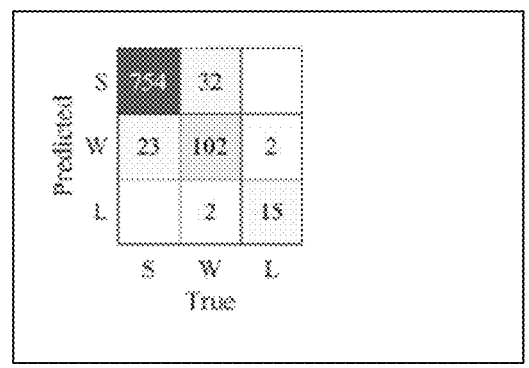

FIG. 2B illustrates a confusion matrix of the concerned prediction results.

Figure 3:
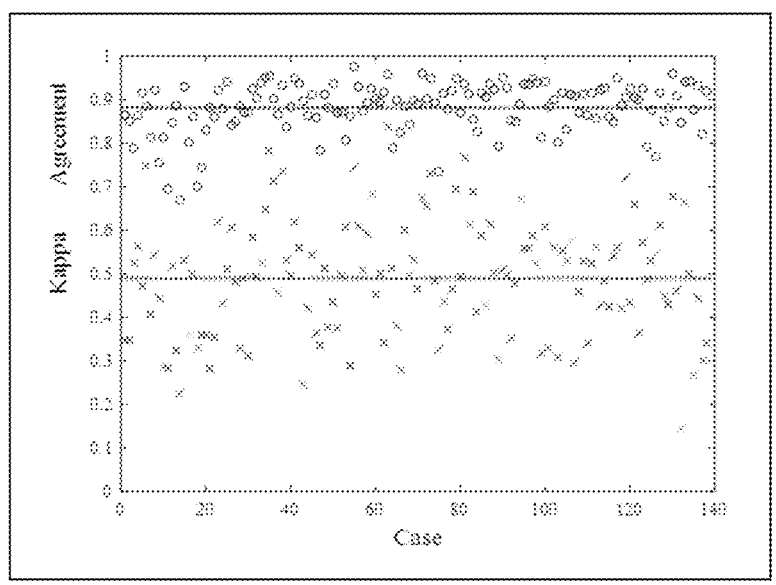
FIG. 3 Mean Kappa coefficient of the activity state prediction results from the previous 8 data sets FIG. 4(A) and FIG. 4(B) and FIG. 4(C) ROC curve of the activity state prediction results from the previous 8 data sets.

FIG. 3 illustrates distributions of an accuracy and Kappa coefficient in this prediction example (sample size, 138 subjects) with the mean accuracy of 0.882±0.057 (standard deviation [SD]) and the mean Kappa coefficient of 0.490±0.134 (SD), indicating good agreement. Based on the mean Kappa coefficient of 0.490±0.134 for the overall prediction examples, this activity state prediction system is considered to perform "adequately agreed" prediction.

Figure 4A:
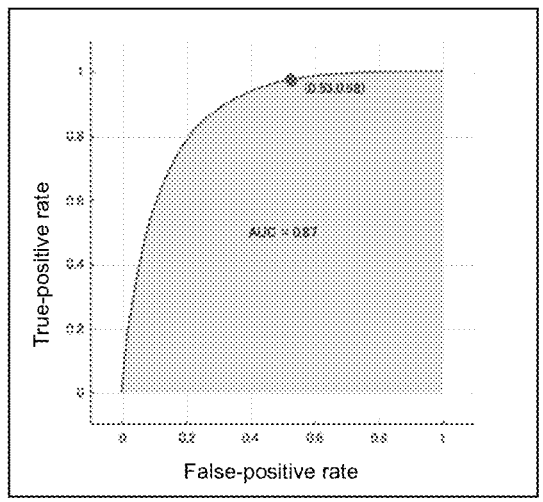
FIG. 4(A), FIG. 4(B), and FIG. 4(C) illustrate ROC curves for the sleeping, awake, and leaving-bed states, respectively.

FIG. 4A illustrates a Receiver Operating Characteristic (ROC) curve for prediction of the sleeping state. The horizontal axis represents a false-positive rate or proportion of cases that were actually not in a sleeping state but were wrongly predicted as the sleeping state. The vertical axis represents a true-positive rate or proportion of cases that were actually in a sleeping state and were correctly predicted as the sleeping state. For the sleeping state, the true-positive and false-positive rates are 0.98 and 0.53, respectively.

The area under the curve (AUC) represents an area under the ROC curve and is indicative of performance of the prediction system. The AUC may vary from 0.5 to 1, and the value closer to 1 indicates high predictive accuracy. For the sleeping state, the AUC is 0.87.

Figure 4B:
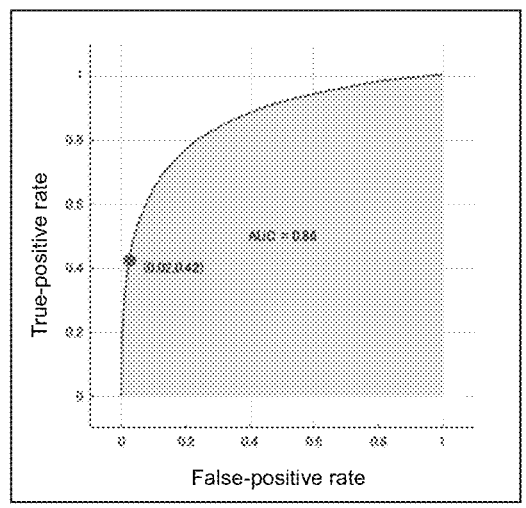

FIG. 4B illustrates a ROC curve for prediction of the awake state. The horizontal axis represents a false-positive rate or proportion of cases that were actually not in an awake state but were wrongly predicted as the awake state. The vertical axis represents a true-positive rate or proportion of cases that were actually in an awake state and were correctly predicted as the awake state. For the awake state, the true-positive and false-positive rates are 0.42 and 0.02, respectively.

The AUC represents as described in FIG. 4A. For the awake state, the AUC is 0.86.

Figure 4C:
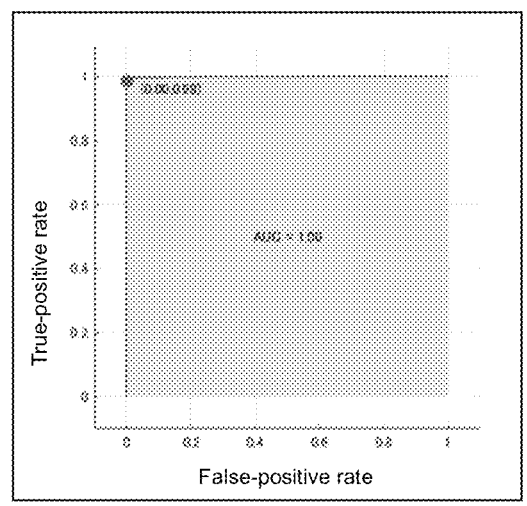

FIG. 4C illustrates a ROC curve for prediction of the leaving-bed state. The horizontal axis represents a false-positive rate or proportion of cases that were actually not in a leaving-bed state but were wrongly predicted as the leaving-bed state. The vertical axis represents a true-positive rate or proportion of cases that were actually in a leaving-bed state and were correctly predicted as the leaving-bed state. For the leaving-bed state, the true-positive and false-positive rates are 0.99 and 0.00, respectively.

The AUC represents as described in FIG. 4A. For the leaving-bed state, the AUC is 1.00, indicating that a perfect prediction model for the leaving-bed state is established.

Figure 5:
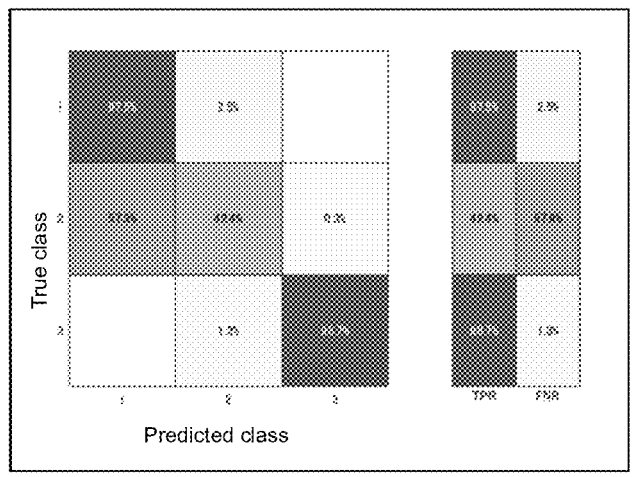
FIG. 5 Confusion matrix of the prediction results from the previous 8 data sets in all subjects and measured values (true values)

A block on the left side in FIG. 5 illustrates a confusion matrix of the concerned overall prediction examples (sample size, 138 subjects).

In this block, 1, 2, and 3 stand for sleeping, awake, and leaving-bed states, respectively.

TPR under a block on the right side stands for a true-positive rate and represents a proportion of cases that were actually in a sleeping, awake, or leaving-bed state and were correctly predicted as such.

FNR stands for a false-positive rate and represents a proportion of cases that were actually in one of sleeping, awake, leaving-bed states but wrongly predicted as either of the remaining two states.

Figure 6:
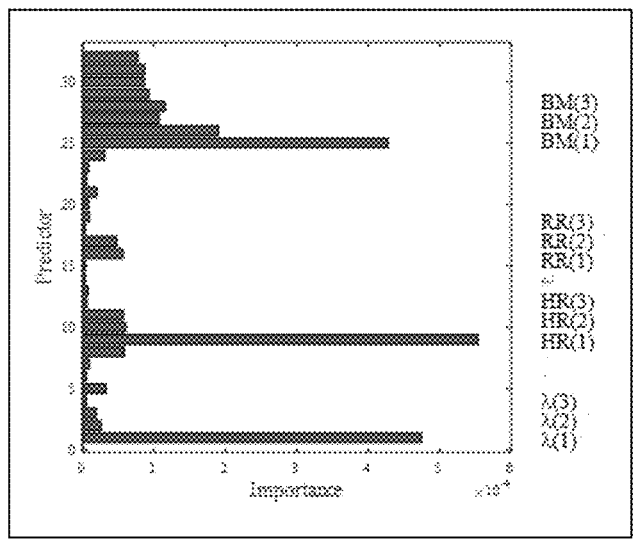
FIG. 6 Importance of each predictor in the activity state prediction model using the previous 8 data sets FIG. 7(A) and FIG. 7(B) Example of activity state prediction from the previous 2 data sets in a subject.

FIG. 6 illustrates contribution of each predictor in the concerned ensemble learner and indicates that the last data subset on body movement signals (BM), heart rate (HR), and phase coherence (λ) have great contributions, while on body movement signals, the further previous values have substantial contribution.

[Example where Leaving-Bed/Awake/Sleeping State is Predicted Based on the Previous 2 Data Sets]

Firstly, machine learning was performed by an ensemble learner with weak learners combined in series (adaptive boosting), using measured PSG values from 138 subjects as teaching data and data on body movement signals, respiratory rate, heart rate, and phase coherence (λ) measured simultaneously with PSG as input data. The training was performed using data from 137 out of 138 subjects, leaving out of 1 subject for leave-one-out cross-validation.

Then, the previous 2 data sets on body movement signals, respiratory rate, heart rate, and phase coherence (λ) obtained from the subject for validation are entered in the ensemble learner for prediction of leaving-bed/awake/sleeping state.

Figure 7A:
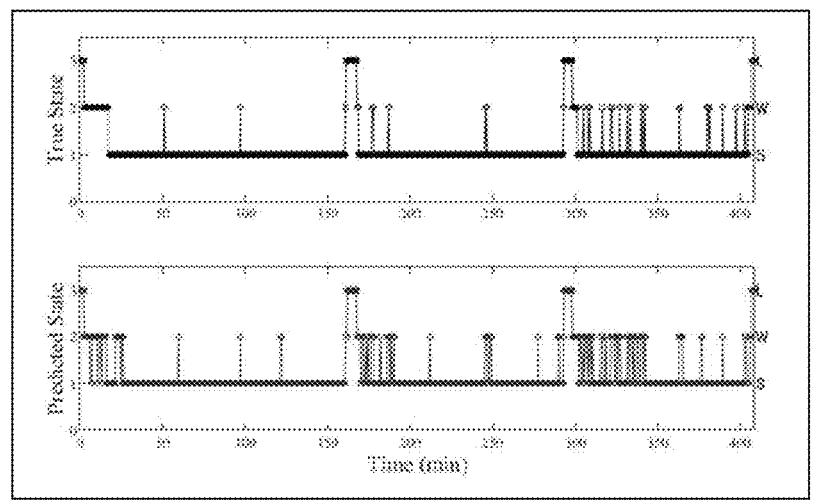
FIG. 7(A) illustrates activity state predicted based on PSG data in the top graph and activity state predicted by the present invention in the bottom graph.

FIG. 7 illustrates an example of the activity state prediction results of a subject. The top graph in FIG. 2A illustrates measured PSG values (true values), and L, W, and S stand for leaving-bed, awake, and sleeping states, respectively. The bottom graph in FIG. 7A illustrates prediction results from the ensemble learner, which have agreement with an accuracy of 0.900 and Kappa coefficient of 0.634. The above Kappa coefficient of 0.634 indicates achievement of "well-agreed" prediction results.

Figure 7B:
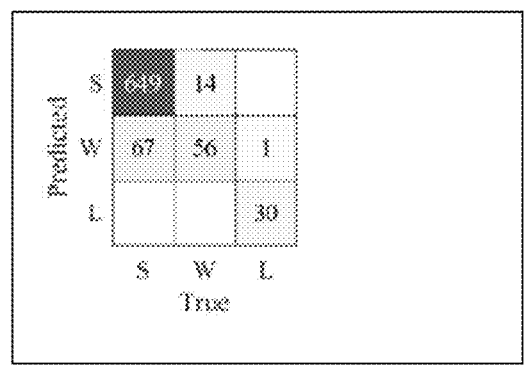
FIG. 7(B) illustrates a confusion matrix of the prediction results and measured values (true values).

FIG. 7B illustrates a confusion matrix of the concerned prediction results.

Figure 8:
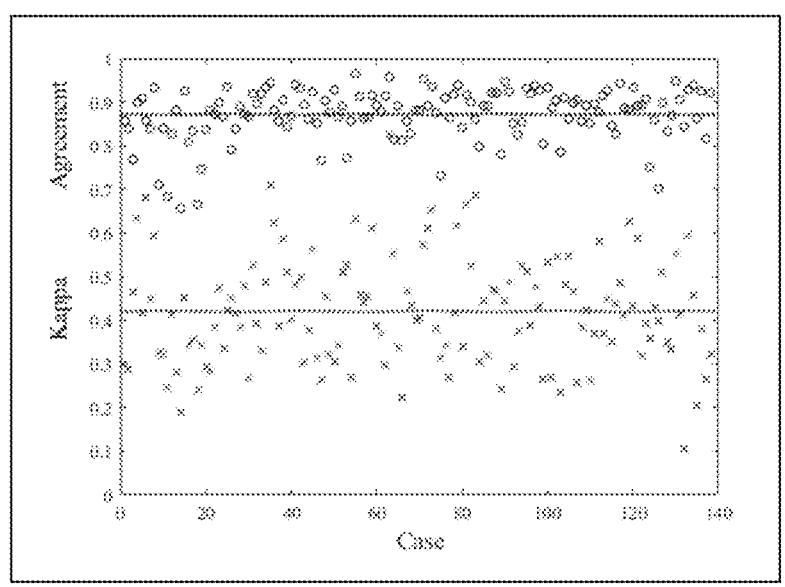
FIG. 8 Mean Kappa coefficient of the activity state prediction results from the previous 2 data sets.

FIG. 8 illustrates distributions of an accuracy and Kappa coefficient in this prediction example (sample size, 138 subjects) with the mean accuracy of 0.872±0.060 (SD) and the mean Kappa coefficient of 0.420±0.124 (SD), indicating good agreement. Based on the mean Kappa coefficient of 0.420±0.124 (SD) for the overall prediction examples, this activity state prediction system is considered to perform "adequately agreed" prediction.

Figure 9A:
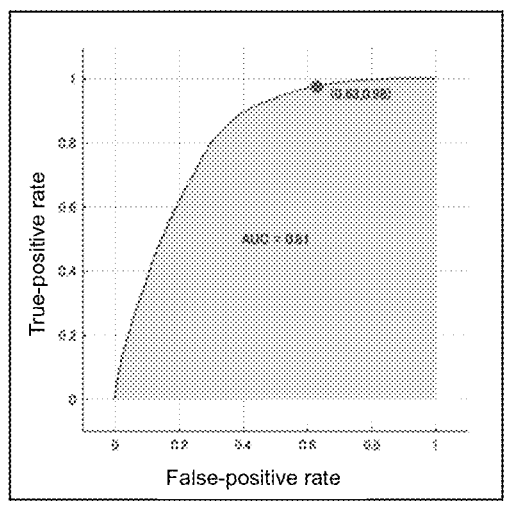
FIG. 9(A) and FIG. 9(B) and FIG. 9(C) ROC curve of the activity state prediction results from the previous 2 data sets.

FIG. 9A illustrates a ROC curve for prediction of the sleeping state. The horizontal axis represents a false-positive rate or proportion of cases that were actually not in a sleeping state but were wrongly predicted as the sleeping state. The vertical axis represents a true-positive rate or proportion of cases that were actually in a sleeping state and were correctly predicted as the sleeping state. For the sleeping state, the true-positive and false-positive rates are 0.98 and 0.63, respectively.

The area under the curve (AUC) represents an area under the ROC curve and is indicative of performance of the prediction system. The AUC may vary from 0.5 to 1, and the value closer to 1 indicates high predictive accuracy. For the sleeping state, the AUC is 0.81.

Figure 9B:
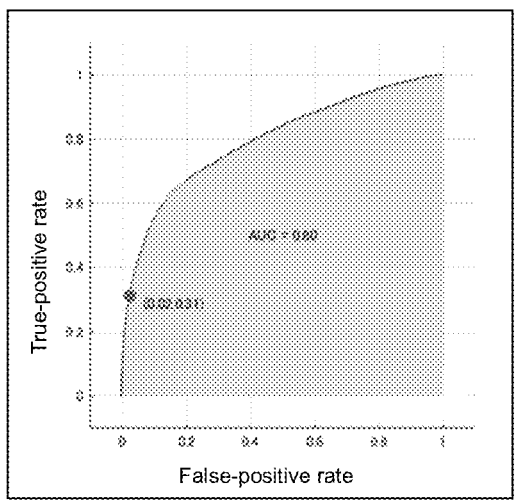

FIG. 9B illustrates a ROC curve for prediction of the awake state. The horizontal axis represents a false-positive rate or proportion of cases that were actually not in an awake state but were wrongly predicted as the awake state. The vertical axis represents a true-positive rate or proportion of cases that were actually in an awake state and were correctly predicted as the awake state. For the awake state, the true-positive and false-positive rates are 0.31 and 0.02, respectively.

The AUC represents as described in FIG. 9A. For the awake state, the AUC is 0.80.

Figure 9C:
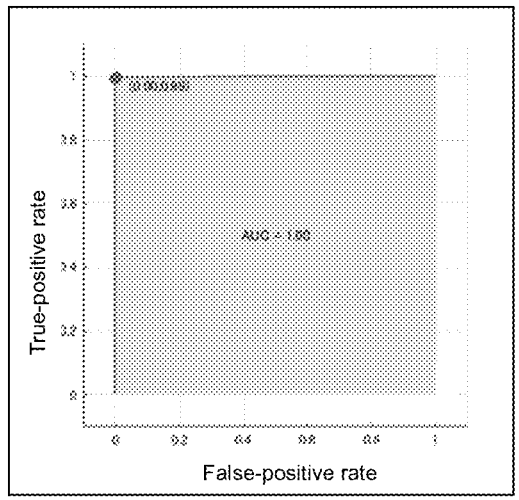

FIG. 9C illustrates a ROC curve for prediction of the leaving-bed state. The horizontal axis represents a false-positive rate or proportion of cases that were actually not in a leaving-bed state but were wrongly predicted as the leaving-bed state. The vertical axis represents a true-positive rate or proportion of cases that were actually in a leaving-bed state and were correctly predicted as the leaving-bed state. For the leaving-bed state, the true-positive and false-positive rates are 0.99 and 0.00, respectively.

The AUC represents as described in FIG. 9A. For the leaving-bed state, the AUC is 1.00, indicating that a perfect prediction model for the leaving-bed state is established.

Figure 10:
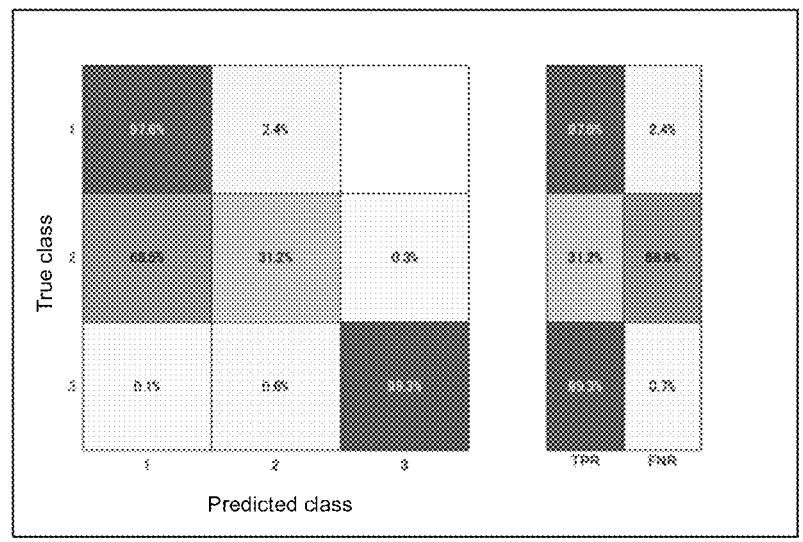
FIG. 10 Confusion matrix of the prediction results from the previous 2 data sets in all subjects and measured values (true values).

A block on the left side in FIG. 10 illustrates a confusion matrix of the concerned overall prediction examples (sample size, 138 subjects).

In this block, 1, 2, and 3 stand for sleeping, awake, and leaving-bed states, respectively.

TPR under a block on the right side stands for a true-positive rate and represents a proportion of cases that were actually in a sleeping, awake, or leaving-bed state and were correctly predicted as such.

FNR stands for a false-positive rate and represents a proportion of cases that were actually in one of sleeping, awake, leaving-bed states but wrongly predicted as either of the remaining two states.

Figure 11:
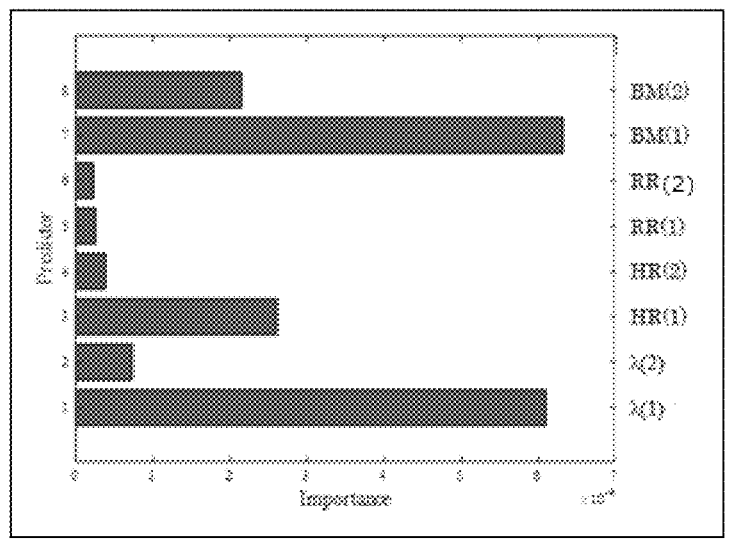
FIG. 11 Importance of each predictor in the activity state prediction model using the previous 2 data sets.

FIG. 11 illustrates contribution of each predictor in the concerned ensemble learner and indicates that the previous 2 values on body movement signals (BM) and the last data subset on heart rate (HR) and phase coherence (λ) have great contributions.

As described above, the present invention accurately predicts a leaving-bed/awake/sleeping state of a person lying on a bed equipped with a sheet-type piezoelectric sensor in an unrestrained manner on real-time basis.

Accordingly, by the present invention, elderly care home personnel can be informed of a sleeping or awake state of a person lying on a bed on real-time basis all day long so that they can take care of the care-recipient without disturbing his or her sleep. The present invention therefore can contribute to reduction of care-givers' burden.

In addition, the concerned technology may allow real-time monitoring of awake/sleeping states in newborns and infants, if applied to them, potentially contributing to early detection and resolution of their developmental problems such as developmental disorder and sleep disorder.

REFERENCE SIGNS LIST

1 Activity state prediction system
2 Activity state prediction part
21 Bio-vibration signal receiving part
22 Body movement signal detection part
23 Respiratory rate detection part
24 Heart rate detection part
25 Phase coherence (λ) computation part
26 Activity state prediction apparatus
3 Sensor part

The invention claimed is:

1. An activity state prediction system, comprising:
a sensor part configured to detect bio-vibration signals of an animal;
a bio-vibration signal receiving part configured to receive the bio-vibration signals output by the sensor part;
a body movement signal detection part configured to output body movement signal from each of the bio-vibration signals;
a respiratory rate detection part configured to output respiratory rate from each of the bio-vibration signals;
a heart rate detection part configured to detect heart rate from each of the bio-vibration signals;
a phase coherence computation part configured to calculate phase coherence from a difference in instantaneous phase between heartbeat interval variation and respiratory pattern detected from the bio-vibration signals; and
an activity state prediction apparatus configured to predict activity state,
wherein the activity state prediction apparatus undergoes machine learning using information on leaving bed, awake, or sleeping state based on sleep polysomnography data as teaching data and the body movement signal, the respiratory rate, the heart rate, and the phase coherence of the animal as input data, the input data being synchronized with the teaching data to establish an activity state prediction model, and then predicts leaving-bed, awake, or sleeping state of the animal in response to entry of the body movement signal, the respiratory rate, the heart rate, and the phase coherence of the animal.

2. An activity state prediction system according to claim 1, wherein the prediction apparatus establishes the activity state prediction model through adaptive boosting with weak learners (decision tree) combined in series.

3. An activity state prediction system according to claim 1, wherein the activity state prediction apparatus predicts the activity state in response to entry of 2 to 20 data sets, each of the data sets including past body movement signal, past respiratory rate, past heart rate, and past phase coherence.

4. A method for activity state prediction, comprising the steps of:
  receiving bio-vibration signals output by a sensor part;
  detecting body movement signal from each of the bio-vibration signals by a body movement signal detection part, detecting respiratory rate from each of the bio-vibration signals by a respiratory rate detection part, detecting heart rate from each of the bio-vibration signals by a heart rate detection part, and calculating phase coherence from a difference in instantaneous phase between heartbeat interval variation and respiratory pattern detected from the bio-vibration signals by a phase coherence computation part;
  undergoing machine learning using information on leaving bed, awake, or sleeping state based on sleep polysomnography data as teaching data and the body movement signal, the respiratory rate, the heart rate, and the phase coherence as input data, the input data being synchronized with the teaching data to establish an activity state prediction model by an activity state prediction apparatus; and
  predicting leaving-bed, awake, or sleeping state of a test animal in response to entry of the body movement signal, the respiratory rate, the heart rate, and the phase coherence of the test animal.

5. A non-transitory tangible computer-readable storage media storing computer-executable instructions for activity state prediction, the instructions comprising:
  receiving bio-vibration signals output by a sensor part;
  outputting body movement signal from each of the bio-vibration signals;
  outputting respiratory rate from each of the bio-vibration signals;
  detecting heart rate from each of the bio-vibration signals;
  calculating phase coherence from a difference in instantaneous phase between heartbeat interval variation detected from the bio-vibration signals and respiratory pattern;
  undergoing machine learning using information on leaving bed, awake, or sleeping state based on sleep polysomnography data as teaching data and the body movement signal, the respiratory rate, the heart rate, and the phase coherence as input data, the input data being synchronized with the teaching data to establish an activity state prediction model; and
  predicting leaving-bed, awake, or sleeping state of a test animal in response to entry of the body movement signal, the respiratory rate, the heart rate, and the phase coherence of the test animal.

* * * * *